United States Patent
Taya et al.

[11] 3,716,560
[45] Feb. 13, 1973

[54] 4,5-TETRAMETHYLENE FURFURYL AND 4,5-TETRAMETHYLENE-3-FURYLMETHYL CHRYSANTHEMATES

[75] Inventors: Nobushige Taya, Minoo; Toshio Mizutani, Hirakata; Shigeyoshi Kitamura; Yositosi Okuno, both of Toyonaka; Keimei Fujimoto, Kobe, all of Japan

[73] Assignee: Sumitomo Chemical Company, Ltd., Osaka, Japan

[22] Filed: March 26, 1970

[21] Appl. No.: 22,995

[52] U.S. Cl. ........260/346.2 R, 260/327 B, 424/285
[51] Int. Cl. .................................C07d 5/36
[58] Field of Search....................260/346.2

[56] References Cited

UNITED STATES PATENTS

| | | | |
|---|---|---|---|
| 3,465,007 | 9/1969 | Elliot | 260/347.4 |
| 3,567,740 | 3/1971 | Matsui et al. | 260/347.4 |

Primary Examiner—Alex Mazel
Assistant Examiner—Bernard Dentz
Attorney—Stevens, Davis, Miller & Mosher

[57] ABSTRACT

Cyclopropanecarboxylic acid esters represented by the formula,

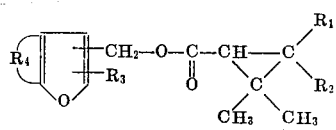

wherein $R_1$ represents hydrogen or methyl; $R_2$ represents methyl, 2-methyl-1-propenyl or 2-methoxycarbonyl-1-propenyl when $R_1$ is hydrogen and $R_2$ represents methyl when $R_1$ is methyl; $R_3$ represents hydrogen or methyl; and $R_4$ represents a lower alkylene radical containing or not containing oxygen or sulfur atom in its carbon chain, the alkylene having up to four carbon atoms, which may be useful as insecticides having high insecticidal effects and low toxicity to mammals.

5 Claims, No Drawings

4,5-TETRAMETHYLENE FURFURYL AND 4,5-TETRAMETHYLENE-3-FURYLMETHYL CHRYSANTHEMATES

The present invention relates to novel cyclopropanecarboxylic acid esters and a process for producing the novel carboxylic acid esters. Further, the invention relates to novel furfuryl alcohols which may be used as starting materials for producing said esters and a process for producing the novel furfuryl alcohols. Further, the invention pertains to insecticidal compositions containing said esters as an active ingredient.

Among the insecticides used at present time, nothing can compare with pyrethrum extracts including pyrethrin or synthetic allethrin which is a homologue thereof, in the fact that it can be used without anxiety due to its harmlessness to mammals and cattles in spite of its immediate effect. However, the pyrethrum extract and homologue thereof are relatively expensive, and are rather limited in the use despite of their excellent usefulness.

After studying to obtain new effective esters, the inventors have found a new type ester which is remarkably excellent in insecticidal activity as compared with the above pyrethrin and its homologue and is prepared at low costs. Thus, the present invention is achieved.

According to the present invention, novel esters are provided, said esters having the formula,

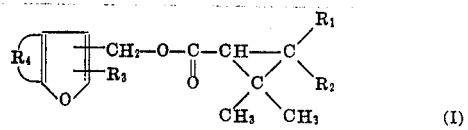

(I)

wherein $R_1$ represents hydrogen or methyl; $R_2$ represents methyl, 2-methyl-1-propenyl or 2-methoxycarbonyl-1-propenyl when $R_1$ is hydrogen and $R_2$ represents methyl when $R_1$ is is methyl; $R_3$ represents hydrogen or methyl; and $R_4$ represents lower alkylene containing or not containing an oxygen or sulfur atom in its carbon chain.

It will be appreciated that the novel ester of formula (I) includes naturally optically active isomers which occur due to the asymmetric carbon atom possibly present in the carboxylic acid moiety such as d-trans-chrysanthemum-monocarboxylic residue.

Among the esters represented by the formula (I), the especially useful ones that are not limitative in the present invention, are enumerated as follows:

| Compound No. | Structure | |
|---|---|---|
| 1 | 4,5-tetramethylenefurfuryl chrysanthemate. | $n_D^{25}$ 1.5058 |
| 2 | 4,5-tetramethylene-3-furylmethyl chrysanthemate. | $n_D^{25}$ 1.5075 |
| 3 | 3-methyl-4,5-tetramethylenefurfuryl chrysanthemate. | $n_D^{25}$ 1.5042 |
| 4 | 2-methyl-4,5-tetramethylene-3-furylmethyl chrysanthemate. | $n_D^{25}$ 1.5066 |
| 5 | 4',5'-tetramethylenefurfuryl 2,2,3,3-tetramethylcyclopropanecarboxylate. | $n_D^{25}$ 1.5014 |
| 6 | 4',5'-tetramethylene-3-furylmethyl 2,2,3,3-tetramethylcyclopropanecarboxylate. | $n_D^{25}$ 1.5034 |

The ester of formula (I) has an excellent activity for killing insects such as houseflies, mosquitoes, cockroaches and the like, and can be used as insecticidal compositions not only in a wide scope of the prevention of epidemics but also controlling insects injurious to stored cereals, agriculture, especially crops before harvest, household horticulture, green-house cultivation and food-packaging, without anxiety due to its low toxicity.

The ester of formula (I) is prepared for the first time by the present inventors, and is obtained easily and in good yield, for example, by the method comprising reacting a furan derivative represented by the formula,

(II)

wherein $R_3$ and $R_4$ are as defined above and A represents hydroxyl, halogen or tosyloxy, with a cyclopropanecarboxylic acid of the formula,

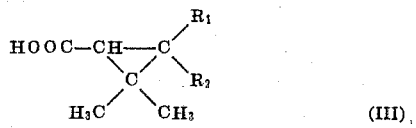

(III)

wherein $R_1$ and $R_2$ are same as defined above, or its reactive derivatives, in the presence of suitable reaction-auxiliary agent, if necessary.

The furan derivative of formula (II) used in the method of the present invention is selected in such a relation of the other reactant, cyclopropanecarboxylic acid and its reactive derivatives of formula (III) as to enable it to be subjected to esterification. The reactive derivatives of the carboxylic acid of formula (III) means corresponding acid halide, acid anhydride, loweralkyl ester or salt. The following disclosure will explain more particularly the method of the preparation of the cyclopropanecarboxylic acid ester of formula (I) according to the present invention.

The first embodiment of the method is to obtain the objective ester by reacting as the furan derivative an alcohol of the formula,

(IV)

wherein $R_3$ and $R_4$ are as defined above, with the cyclopropanecarboxylic acid of formula (III), acid halide, acid anhydride or lower alkyl ester thereof. When the acid itself is used, the reaction is completed under the condition of dehydration. Thus, the reaction may be carried out in an inert solvent such as benzene, petroleum ether, containing a dehydrating agent such as dicyclohexylcarbodiimide with or without heating.

When the acid halide is used, the reaction is effected well at room temperature in the presence of an organic tertiary amine such as pyridine, triethylamine and the like as a de-hydrogen halide agent. The acid halide used may be any ones, but acid chloride is usually used. In the reaction, the use of solvents is preferable to allow the reaction to proceed smoothly, and an inert solvent such as benzene, toluene and petroleum benzine is preferably used.

When the acid anhydride is used as the reactant, the reaction can proceed without any reaction-auxiliary agent well at room temperature to form the objective ester of formula (I). The warming of the reaction system and the use of solvents are favorable for allowing reaction to proceed smoothly, but they are not always indispensable.

When the lower alkyl ester is used as the reactant, the reaction is completed in the presence of a basic catalyst such as sodium alkoxide under heating condition, and proceeds smoothly by the use of an inert solvent such as benzene, toluene and the like. The preferable lower alkyl esters used in the present method include methyl ester, ethyl ester, n-propyl ester, iso-propyl ester and n-butyl ester of the cyclopropanecarboxylic acid of formula (III).

The second embodiment of the process according to the present invention is to prepare the objective ester of formula (I) from furylmethyl halides of the formula,

(V)

wherein X is a halogen atom, and $R_3$ and $R_4$ are as defined above. The another reactant is the salts of the carboxylic acid of formula (III) with alkali metals or tertiary amines, which salts may be formed in the reaction by adding the corresponding bases forming such salts to the reaction mixture. The reaction is preferably carried out in the presence of an inert solvent such as benzene, acetone and the like at a temperature of the boiling point of the solvents or lower for allowing the reaction to proceed. Among the halogen atoms represented by X in formula (V), chlorine or bromine atom is, in general, common, but other halogen atoms may be selected optionally.

The third embodiment of the method according to the present invention is to obtain the objective ester of formula (I) from furylmethyl-tosylates of the formula,

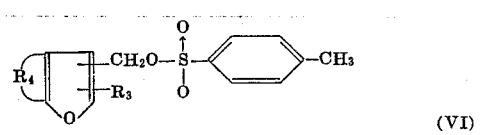

(VI)

wherein $R_3$ and $R_4$ are as defined above.

In this case, the another reactant is the same as used in the second embodiment, and the reaction condition is also same as that used therein.

The cyclopropanecarboxylic acid of formula (III) used as the reactant according to the present invention can be prepared by already known process, and, if necessary, may be converted to each of the reactive derivatives according to well known method.

It well be appreciated that the carboxylic acids of formula (III) and its derivatives may include optically active isomers such as d-trans-chrysanthemic acid and reactive derivatives thereof.

The furan derivatives of the formula (IV) are novel compounds and therefore the present invention is also relates to the furan derivatives of formula (IV) and to a process for the production thereof.

Firstly, a process for producing furfuryl alcohols having the formula,

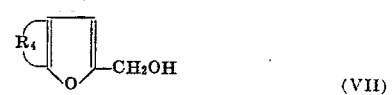

(VII)

wherein $R_4$ is as defined above, according to the present invention comprises the following course of synthesis. The furan ring formation utilized in the present invention is disclosed in, for example, David L. Storm et al.'s article, Tetrahedron Letters, 1967, page 1865. The furancarboxylic acid ester (XII) and the furfuryl alcohol (VII) are novel compounds which are not described in literature.

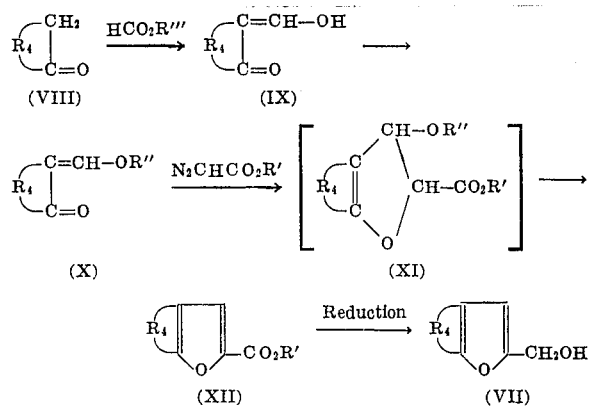

In the above equation, $R_4$ is as defined above and $R'$, $R''$ and $R'''$ are lower alkyl groups. The synthesis course of this invention is briefly explained below.

α-Hydroxymethyleneketone (IX) is obtained by formylating the methyleneketone (VIII) according to the ordinary formylation, that is, by reacting the ketone (VIII) with a lower alkyl ester of formic acid in the presence of a base as a condensing agent widely used in the Claisen reaction such as an alkali metal alkoxide, an alkali metal hydride or an alkali metal sand in an anhydrous organic solvent free from active carbonyl, such as, for example, an inert organic solvent such as ether, benzene, etc. and a polar organic solvent such as alcohol, dimethylformamide, dimethyl sulfoxide, etc.

Secondly, the enol ether (X) can be produced by the ordinary esterification procedure in a neutral or basic medium. The esterification procedure comprises either reacting the ketone (IX) with an alkylating agent such as dimethyl sulfate, methyl iodide, etc. in the presence of an alkali metal alkoxide or reacting the ketone (IX) with diazomethane. However, the most suitably utilizable procedure is to react the ketone (IX) with a lower alkyl orthoformate in the presence of a catalytic amount of an acid in a lower alcohol. An example thereof is disclosed in E. Earl Royals et al.'s article, J. Am. Chem. Soc., Vol. 75, page 2050.

The enol ether (X) thus obtained is then reacted with an equimolar or more amount of a diazoacetate in the presence of a catalyst such as anhydrous copper sulfate desirably at a temperature within the range from 100° to 200° C. It is assumed that the compound (XI) is once formed by the above reaction. The reaction mixture is then thermally decomposed into the furancarboxylic acid ester (XII) in the presence or absence of a catalytic amount of an acid such as p-toluenesulfonic acid at a temperature up to 200° C.

The ester (XII) is then easily converted into the furfuryl alcohol (VII) by use of a hydrogenated aluminum compound such as lithium aluminum hydride, in an ether solvent such as diethyl ether, tetrahydrofuran, etc. The furfuryl alcohol (VII) thus obtained is a comparatively stable compound and can be purified by distillation.

Secondly, a process for producing 3-furylmethyl alcohols having the formula,

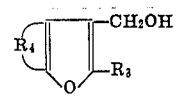

wherein $R_3$ and $R_4$ are as defined above, comprises the following course of synthesis.

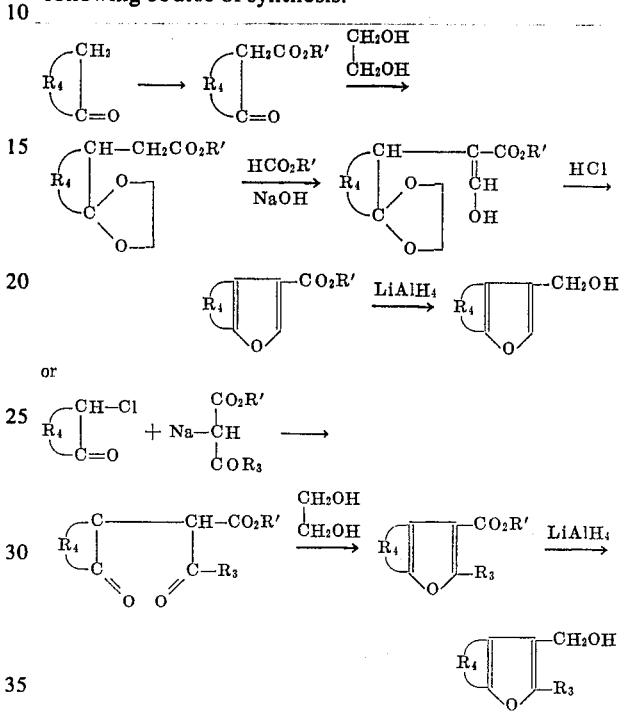

In the above equations, $R_3$, $R_4$ and $R'$ are as defined above.

In the preparation of insecticidal compositions, the new esters of formula (I) may be formulated into any desired forms of oil sprays, emulsifiable concentrates, dusts, wettable powders, aerosols, mosquito coils, fumigants, granules, baits and luring dust or solid preparation, according to known method in the art, using auxiliary agents and/or carriers for common insecticidal compositions.

The insecticidal compositions thus formed may be increased in its activity when used in admixture with a synergist for pyrethroid such as 3,4-methylenedioxy-6-propylbenzylbutyldiethylene glycol ether (hereinafter referred to as "piperonylbutoxide"), 1,2-methylenedioxy-4-[2-(octylsulfinyl)-propyl]-benzene (hereinafter referred to as "sulfoxide"), 4-(3,4-methylenedioxyphenyl)-5-methyl-1,3-dioxane (referred to as "sulfroxane"), N-(2-ethylhexyl)-bicyclo[2,2,1]hepta-5-ene-2,3-dicarboximide (hereinafter referred to as "MGK-264," registered trade name for said imide produced by McRolin Gormley King Co.), N-(4-pentynyl)-phthalimide or n-propyl-0-propargylphenyl phosphonate (hereinafter referred to NIA-16388). When the present compounds are formulated into mosquito coils, the activity can be increased by incorporation of a known additive therefor, such as terephthalic or isophthalic acid and butylhydroxy-toluene (referred to as "BHT"). In addition, the present compounds may be formulated into multipurpose compositions by incorporating other active ingredients such as pyrethroids, for example, pyrethrum extracts, allethrin, 3,4,5,6-tetrahydrophthalimidomethyl chrysanthemate (hereinafter referred to as "tetramethrin"), 5-benzyl-3-furylmethyl chrysanthemate; organic chloride insecticides, for example, dichlorodiphenyl-trichloromethane (referred to as "DDT"), benzene hexachloride (referred to as "BHC") and methoxychlor; organophosphorus insecticides, for example, 0.0-dimethyl-0-(3-metyl-4-nitrophenyl) phosphorothioate (hereinafter referred to as "fenitrothion"), 0.0-dimethyl-0-(2,2-dichlorovinyl) phosphate (referred to as "DDVP"); carbamate type insecticides, for example, 1-naphthyl-N-methylcarbamate and 3,4-xylyl-N-methylcarbamate; or other insecticides, fungicides, acaricides, herbicides, fertilizers or other agricultural chemicals.

The present invention will be more particularly illustrated by the following Examples which should not restrict the invention defined in the attached claims.

EXAMPLES 1 to 9

Production of the esters represented by the formula (I)

The esters shown in Table 1 were produced by standard processes each represented by A, B, C, D, E and F as follows:

Process A

A reaction of an alcohol with a carboxylic acid halide.

0.05 Mol of an alcohol was dissolved in three times the volume of dry benzene. 0.07 Mol of pyridine was added to the solution. On the other hand, 0.053 mol of a carboxylic acid ester was dissolved in three times the volume of dry benzene. The solution thus obtained was added at a time to the above-mentioned solution, whereupon an exothermic reaction occurred. After the solution had been allowed to stand overnight in a tightly sealed vessel, a small amount of water was added to dissolve pyridine hydrochloride precipitated. The aqueous layer was separated and the organic layer was then washed with 5 percent aqueous hydrochloric acid, a saturated aqueous solution of sodium bicarbonate and a saturated aqueous salt solution successively. After the organic layer had been dried on anhydrous sodium sulfate, the benzene was removed by distillation. The remaining liquid was purified by silica gel chromatography to obtain the final product in the form of a light yellow oil.

Process B

A reaction (dehydration) between an alcohol and a carboxylic acid.

A solution of 0.05 mol of an alcohol in three times the volume of benzene was mixed with a solution of 0.05 mol of a carboxylic acid in three times the volume of benzene. 0.08 Mol of dicyclohexylcarbodiimide was added thereto. After the mixture had been allowed to stand overnight in a tightly sealed vessel, the mixture was refluxed for two hours to complete the reaction. The same after-treatment as in the standard operational method A was then carried out to obtain the final product.

Process C

A reaction of an alcohol with a carboxylic acid anhydride.

0.05 Mol of an alcohol was dissolved in three times the volume of toluene. 0.055 Mol of a carboxylic acid anhydride synthesized from the corresponding carboxylic acid and acetic anhydride was added thereto. The mixture was then reacted for three hours at 100° C. The reaction mixture was cooled and a 10 percent aqueous solution os sodium hydroxide was added at a temperature of 10° C or less to neutralize the mixture. Excess of the acid anhydride and the carboxylic acid formed by the reaction were recovered in the form of sodium salt. The after-treatment of the organic layer was then carried out in the same manner as in the standard operational method A to obtain the desired ester.

Process D

A transesterification between an alcohol and a lower alkyl carboxylate.

0.05 Mol of an alcohol and 0.06 mol of an ethyl carboxylate were dissolved in five time the volume of dry toluene. 2 Grams of sodium ethoxide was added. The mixture was then refluxed with well stirring for 10 hours to complete the reaction. Cold water was carefully added and the mixture was separated into an aqueous layer and an organic layer. The after-treatment was then carried out in the same manner as in the standard operational method A to obtain the final product.

Process E

A reaction of a methyl halide compound with a carboxylic acid.

0.05 Mol of a methyl halide compound and 0.06 mol of a carboxylic acid were dissolved in three times the volume of acetone. The solution was warmed at 15° to 20° C. A solution of 0.08 mol of triethylamine in three times the volume of acetone was dropped into the above solution with stirring in 1 hour. The mixture was then refluxed for two hours to complete the reaction. After the reaction mixture had been cooled, the triethylamine hydrochloride separated was filtered off and the acetone was removed from the filtrate by distillation. Three times the volume of benzene was added to the remaining liquid and the after-treatment of the liquid was carried out in the same manner as in the standard operational method A to obtain the desired ester.

Process F

A reaction of the tosylate of an alcohol with a carboxylate.

0.05 Mol of a tosylate was dissolved in three times the volume of acetone. 0.06 Mol of sodium carboxylate, synthesized by reacting the corresponding carboxylic acid with an equimolar amount of sodium hydroxide in water and distilling off the water and evaporating the residue to dryness, was added at room temperature with well stirring in 30 minutes. The mixture was then refluxed for 30 minutes to complete the reaction. After the mixture had been cooled, the solid matter separated was removed by filtration and the acetone was removed from the filtrate by distillation. The residue was dissolved in three times the volume of benzene. The after-treatment of the solution was then carried out in the same manner as in the standard operational method A to obtain the final product.

The results obtained by carrying out the above-mentioned standard operational methods are shown in the following Table 1.

TABLE 1

| Example No. | Furan derivative | Acid or its derivative | Method of production | Name of compound | Yield, percent | Refractive index | Found C | Found H | Calcd. C | Calcd. H |
|---|---|---|---|---|---|---|---|---|---|---|
| 1 | 2-chloromethyl-4,5-tetramethylenefuran. | (±)-cis·trans-chrysanthemum-monocarboxylic acid. | E | 4,5-tetramethylenefuryl chrysthemate. | 90 | 1.5058 | 75.3 | 8.8 | 75.5 | 8.7 (as $C_{19}H_{28}O_{23}$) |
| 2 | 3-hydroxymethyl-4,5-tetramethylenefuran. | (±)-cis·trans-chrysanthemum-monocarboxylic acid anhydride. | C | 4,5-tetramethylene-3-furyl-methyl chrysanthemate. | 85 | 1.5075 | 75.2 | 8.7 | 75.5 (as $C_{19}H_{26}O_3$) | 8.7 |
| 3 | 3-methyl-4,5-tetramethylene furfuryl alcohol. | (±)-cis·trans-chrysanthemum-monocarboxylic acid chloride. | A | 3-methyl-4,5-tetramethylenefurfuryl chrysanthemate. | 87 | 1.5042 | 75.7 | 9.2 | 75.9 (as $C_{20}H_{28}O_3$) | 8.9 |
| 4 | 2-methyl-3-hydroxymethyl-4,5-tetramethylenefuran. | (±)-cis·trans-chrysanthemum-monocarboxylic acid chloride. | A | 2-methyl-4,5-tetramethylene-3-furylmethyl chrysanthemate. | 83 | 1.5066 | 75.7 | 9.2 | 75.9 (as $C_{20}H_{28}O_3$) | 8.9 |
| 5 | 4,5-tetramethylenefurfuryl alcohol. | 2,2,3,3-tetramethylcyclopropanecarboxylic acid. | B | 4',5'-tetramethylenefurfuryl 2,2,3,3-tetramethylcyclopropanecarboxylate. | 87 | 1.5014 | 73.8 | 8.9 | 73.9 (as $C_{17}H_{24}O_3$) | 8.8 |
| 6 | 3-tosyloxymethyl-4,5-tetramethylenefuran. | Sodium 2,2,3,3-tetramethylcyclopropanecarboxylate. | F | 4',5'-tetramethylene-3'-furylmethyl 2,2,3,3-tetramethylcyclopropanecarboxylate. | 83 | 1.5034 | 73.5 | 9.1 | 73.9 (as $C_{17}H_{24}O_3$) | 8.8 |
| 7 | 4,5-tetramethylenefurfuryl alcohol. | Ethyl 2,2,3-trimethylcyclopropanecarboxylate. | D | 4',5'-tetramethylenefurfuryl 2,2,3-trimethylcyclopropanecarboxylate. | 84 | 1.5031 | 72.8 | 8.8 | 73.3 (as $C_{16}H_{22}O_3$) | 8.5 |
| 8 | 4,5-tetramethylenefurfuryl alcohol. | (±)-trans-trans-pyrethric acid chloride. | A | 4,5-tetramethylenefuryl pyrethrate. | 91 | 1.5166 | 69.2 | 7.8 | 69.3 (as $C_{20}H_{26}O_5$) | 7.6 |
| 9 | 3-hydroxymethyl-4,5-tetramethylenefuran. | (±)-trans-trans-pyrethric acid. | B | 4,5-tetramethylene-3-furylmethyl pyrethrate. | 87 | 1.5190 | 68.9 | 7.8 | 69.3 (as $C_{20}H_{26}O_5$) | 7.6 |
| 10 | 4,5,6,7-tetrahydro-5-oxa-benzofuryl-2-methyl alcohol. | (±)-cis·trans-chrysanthemum-monocarboxylic acid chloride. | A | 4,5,6,7-tetrahydro-5-oxa-benzofuryl-2-methyl chrysanthemate. | 93 | 1.5127 | 70.1 | 7.9 | 71.0 (as $C_{18}H_{24}O_4$) | 8.0 |
| 11 | 4,5,6,7-tetrahydro-5-oxa-benzofuryl-2-methyl alcohol. | 2,2,3,3-tetramethylcyclopropane carboxylic acid chloride. | A | 4',5',6',7'-tetrahydro-5'-oxa-benzofuryl-2'-methyl 2,2,3,3-tetramethylcyclopropanecarboxylate. | 91 | 1.5083 | 68.1 | 7.9 | 69.0 (as $C_{16}H_{22}O_4$) | 7.9 |
| 12 | 4,5,6,7-tetrahydro-6-oxa-benzofuryl-2-methyl alcohol. | (±)-cis·trans-chrysanthemum-monocarboxylic acid chloride. | A | 4,5,6,7-tetrahydro-6-oxa-benzofuryl-2-methyl chrysanthemate. | 94 | 1.5133 | 71.1 | 7.8 | 71.0 (as $C_{18}H_{24}O_4$) | 8.0 |

The following Examples 13–16 illustrate the production of the novel furancarboxylates and furfuryl alcohols according to the present invention.

EXAMPLE 13

The mixture of 71 grams of α-ethoxymethylene-cyclohexanone and 148 grams of ethyl diazoacetate was dropped into a flask warmed at 120° C containing a catalytic amount of a hydrous copper sulfate and liquid paraffin in a nitrogen stream. The temperature was increased to 160° C by heat generated as a result of the reaction. This temperature was maintained during the dropping. After the dropping had been completed, the light brown liquid was filtered to remove copper sulfate. Then, the liquid was distilled by use of a high vacuum pump at 0.1 mmHg to recover fractions up to 130° C. A catalytic amount of p-toluenesulfonic acid was added to the fractions, which were then rectified. Thus, as the forerunning fraction 18 grams of ethyl 3,4-tetramethyl-ene-2-furancarboxylate was obtained at a boiling point of 78°–81° C/0.1 mmHg, and crystallized, m.p. 56° to 57° C and an I.R. $\bar{\nu}_{max}^{nujol}$ of 1715, 1607 and 1540 cm$^{-1}$, and, 22 grams of the objective ethyl 4,5-tetramethylene-2-furancarboxylate was obtained at a boiling point of 81°–82° C/0.1 mmHg, I.R. $\bar{\nu}_{max}^{neat}$ 1730, 1615 and 1538 cm$^{-1}$.

EXAMPLE 14

1.5 Gram of lithium aluminum hydride was added to 200 ml. of dry ether. Into the mixture a solution of 18 grams of the ester obtained in Example 13 in 50 ml. of dry ether was dropped.

After the dropping had been completed, the mixture was dropped into the mixture of 50 ml. of a saturated Rochelle salt solution and 20 ml. of ice water to decompose the aluminum complex. The product was extracted with ether, washed with a saturated salt water and dried on Glauber's salt. After the solvent had been distilled off, 12.7 grams of 4,5-tetramethylene-2-furfuryl alcohol was obtained by distillation. The product had a boiling point of 82° C/0.3 mmHg, a refractive index of $n_D^{25}$ 1.5235 and an I.R. $\bar{\nu}_{max}^{neat}$ of 3600–3100, 1560, 1443, 998 and 915 cm$^{-1}$.

EXAMPLE 15

Similarly as in Example 13, 30 grams of α-ethoxymethylene-4-oxa-cyclohexanone was reacted with 50 grams of methyl diazoacetate. Thus obtained black brown liquid was chromatographed on 2 cm × 30 cm alumina column and eluted with the mixed solvent of hexane 10 : ethylacetate 1. After evaporation of solvent, main fraction gave a crystalline solid and which was recrystallized from ether-hexane. 6 Grams of methyl 4,5,6,7-tetrahydro-5-oxa-benzofuran-2-carboxylate was obtained and melted at 45°–47° C. I.R. $\bar{\nu}_{max}^{nujol}$ : 1720, 1622 and 1537 cm$^{-1}$.

EXAMPLE 16

Similarly as in Example 14, 5.5 grams of methyl 4,5,6,7-tetrahydro-5-oxa-benzofuran-2-carboxylate was reduced with lithium aluminum hydride in ether and the aluminum complex was decomposed with Rochell salt solution. Extraction with ether and evaporation afforded 4 grams of 4,5,6,7-tetrahydro-5-oxa-benzofuryl-2-methyl alcohol as liquid of $n_D^{25}$ 1.5410.

The preparation and effect of the compositions according to the present invention are illustrated by the following examples and test examples.

The compounds are shown by the above-mentioned compound number.

EXAMPLE 17

0.05 Part of each of the compounds (1) and (2) according to the present invention was dissolved in white kerosene and the whole was made up to 100 parts. Thus, 0.05 percent oil solutions were obtained.

EXAMPLE 18

0.1 Part of each of the compounds (3), (4), (5) and (6) according to the present invention was dissolved in white kerosene. The whole was made up to 100 parts. Thus, 0.1 percent oil solutions were obtained.

EXAMPLE 19

0.05 Part of phthalthrin and 0.5 part of sulfoxide were added to 0.05 part of the compound (1) according to the present invention. The mixture was dissolved in white kerosene and the whole was made up to 100 parts. Thus, an oil solution was obtained.

EXAMPLE 20

0.5 Part of piperonylbutoxide was added to 0.1 part of each of the compounds (3), (4), (5) and (6) according to the present invention. The mixture was dissolved in white kerosene. The whole was made up to 100 parts. Thus, oil solutions were obtained.

EXAMPLE 21

0.25 Part of pyrethrum extract containing 20 percent of pyrethrin and 0.2 part of piperonylbutoxide were added to 0.05 part of the compound (2) according to the present invention. The mixture was dissolved in white kerosene. The whole was made up to 100 parts to obtain an oil solution.

EXAMPLE 22

Thirty Parts of safroxane, 10 parts of Sorpol SM–200 (Registered trade mark of Toho Kagaku Co.) and 50 parts of xylene were added to 10 parts of each of the compounds (1) and (2). The whole was then well stirred to form a solution. Thus, emulsifiable concentrates were obtained.

EXAMPLE 23

0.6 Gram of each of the compound (1) in the form of d-trans compound and the compound (5) according to the present invention was dissolved in 20 ml. of methanol. The solution was intimately mixed with 99.4 grams of a carrier for mosquito coil, obtained by mixing tabu powder, marc and wood powder in a ratio of 3:5:1, with uniform mixing. After the methanol had been evaporated, 150 ml. of water was added. The whole was then well kneaded, formed and dried. Thus, 0.6% mosquito coils were obtained.

EXAMPLE 24

0.2 Part of the compound (1) according to the present invention, 1.0 part of pyrethrum extract containing 20 percent of pyrethrin, 0.5 part of Sumithion, 6.5 parts of xylene and 6.8 parts of deodorized kerosene were mixed and dissolved. The solution was charged into an aerosol container. After a valve part had been installed, 85 parts of a propellant (liquefied petroleum gas) was charged into the container through said valve part. Thus, an aerosol was obtained.

EXAMPLE 25

0.25 Part of the compound (2) according to the present invention, 0.25 part of chrysron, 13.5 parts of deodorized kerosene, 1 part of an emulsifying agent, Atmos 300 (Registered trade mark of Atlas Chemical Industries Inc.) were mixed. 50 Parts of pure water was added and the whole was then emulsified. The emulsion was charged into an aerosol container together with 35 parts of a 3:1 mixture of deodorized butane and deodorized propane. Thus, a water-based aerosol was obtained.

EXAMPLE 26

0.2 Part of the compound (5) according to the present invention, 0.2 part of phthalthrin, 2 parts of NIA–16388, 7 parts of xylene and 5.6 parts of deodorized kerosene were mixed and dissolved. The same treatment as in example 24 gave an aerosol.

EXAMPLE 27

To 0.2 gram of the compound (6) according to the present invention 0.1 gram of allethrin was added. The mixture was dissolved in an appropriate amount of chloroform. The solution was uniformly adsorbed on the surface of an asbestos sheet 2.5 cm × 1.5 cm × 0.3 mm (thickness) on which another asbestos sheet of the same size was stuck. Thus, an fumigating insecticidal composition on a fibrous carrier to be electrically heated was obtained. The fibrous carrier may be not only said asbestos sheet but also any other material having a similar effect such as a pulp sheet.

EXAMPLE 28

One part of each of the compounds (1) and (2) according to the present invention was dissolved in 20 parts of acetone. To the solution 99 parts of 300 mesh kieselguhr was added. The whole was thoroughly mixed stirring in a kneading machine. The acetone was then evaporated to obtain a dust product.

EXAMPLE 29

To 5 parts of the compound (1) according to the present invention there were added 15 parts of piperonylbutoxide and then 5 parts of Toyolignin CT (Registered trade mark of Toyo Boseki K.K.) and 75 parts of GSM Clay (Registered trade mark of Jikuraito Kogyo K.K.). The whole was thoroughly mixed with stirring in a kneading machine. To the mixture 10 percent of water was added and the whole was further stirred. The mixture was formed into granules by a granulating machine, and then air-dried to obtain a granule product.

EXAMPLE 30

Twenty-five Parts of the compound (1) according to the present invention was well mixed with 5 parts of Sorpol SM–200. To the mixture 70 parts of 300 mesh talc was then added. The whole was then thoroughly mixed with stirring in a kneading machine to obtain a wettable powder.

The insecticidal effect of the compositions of the present invention thus obtained is illustrated by the following test examples.

TEST EXAMPLE 1

The insecticidal activity of each of the oil solutions obtained in Examples 17, 18 and 20 was determined by Campbell's turn table method [Soap and Sanitary Chemicals, Vol. 14, No. 6, page 119 (1938)] using about 100 housefly adults as a group. The flies were exposed to the downward spray of 5 ml. of each oil solution for 10 minutes. The flies were then taken out, fed and allowed to stand in a thermostat at 27° C. After 24 hours their death was observed and the mortalities were calculated. The results are shown in Table 2.

Table 2

| Example No. | Composition | Mortality (%) |
|---|---|---|
| 17 (Oil solution) | Containing 0.05% of the compound (1) of the present invention | 95 |
| " | Containing 0.05% of the compound (2) of the present invention | 97 |
| 18 (Oil solution) | Containing 0.1% of the compound (3) of the present invention | 84 |
| " | Containing 0.1% of the compound (4) of the present invention | 88 |
| " | Containing 0.1% of the compound (5) of the present invention | 82 |
| " | Containing 0.1% of the compound (6) of the present invention | 85 |
| 20 (Oil solution) | Containing 0.1% of the compound (3) of the present invention and 0.5% of piperonylbutoxide | 98 |
| " | Containing 0.1% of the compound (4) of the present invention and 0.5% of piperonylbutoxide | 95 |
| " | Containing 0.1% of the Compound (5) of the present invention and 0.5% of piperonylbutoxide | 96 |
| " | Containing 0.1% of the compound (6) of the present invention and 0.5% of piperonylbutoxide | 100 |
| | Containing 0.1% of allethrin oil solution | 54 |
| | Containing 0.1% of pyrethrin oil solution | 79 |

TEST EXAMPLE 2

About 50 housefly adults were released in a glass box of $(70 \text{ cm})^3$ and 0.7 ml. of each of the oil solutions obtained in Examples 19 and 21 was sprayed by a glass atomizer at a pressure of 20 pounds/in.$^2$. Within 10 minutes 90 percent or more of the flies were knocked down. Further, 90 percent or more of the knocked down insects were killed on the next day.

TEST EXAMPLE 3

About 50 northern house mosquito adults were released in a glass box of $(70 \text{ cm})^3$ and 1 gram of each of the mosquito coils obtained in Example 23 which had been ignited at its both ends was placed at the central part of the bottom in the glass box. The knockdown effect to the mosquitoes was observed in relation to the lapse of time. Within 20 minutes 80 percent or more of the insects were knocked down in case of any one of the mosquito coils.

TEST EXAMPLE 4

The insecticidal activity of each of the aerosols obtained in Examples 24, 25 and 26 against housefly adults was determined by the aerosol testing method using Peet-grady's chamber [as described in "Soap and Chemical Specialities Blue Book (1965)"]. The results are shown in Table 3.

Table 3

| Composition | Amount sprayed (g/1000 ft$^3$) | Knock-down % | | | Mortality (%) |
|---|---|---|---|---|---|
| | | 5 Min. | 10 Min. | 15 Min. | |
| Aerosol of Example 24 | 2.8 | 22 | 67 | 92 | 85 |
| Water-based aerosol of Example 25 | 3.2 | 14 | 58 | 90 | 81 |
| Aerosol of Example 26 | 3.1 | 25 | 70 | 96 | 90 |

TEST EXAMPLE 5

About 50 northern house mosquito adults were released in a glass box of $(70 \text{ cm})^3$. The hot fumigating composition of the present invention was placed on an electric heating plate to heat and fumigate it. Within 20 minutes 90 percent or more of the insects were knocked down.

TEST EXAMPLE 6

The wall of a deep glass Petri dish having an inside diameter of 14 cm and a height of 7 cm except about 1 cm from the bottom was coated with butter. Each of the dusts obtained in Example 28 was uniformly spreaded on the bottom surface of the dish at a rate of 2 g/m$^2$.

Ten German cockroach adults were released in the dish and contacted with the dust for 20 minutes. In all cases, after one day 80 percent or more of the cockroaches were knocked down, and after three days 90 percent or more of the insects were killed.

TEST EXAMPLE 7

Ten Liters of water was entered into a 14 liter polyethylene bucket, into which 3 grams of the granules obtained in Example 29 was thrown. After one day about 100 larvae (last instar) of northern house mosquitoes were released in the bucket, and the death of the insects was observed. Within 24 hours 90 percent or more of the larvae were killed.

TEST EXAMPLE 8

To a 1/50,000 Wagner pot a rice plant which had grown for 45 days after seeding was transplanted. A liquid obtained by diluting each of the emulsifiable concentrates of Example 22 with water to 200 times the volume and a liquid obtained by diluting the wettable powder of Example 30 with water to 300 times the volume were sprayed at a rate of 10 ml. per pot. The rice plant was covered by a wire gauze. About 50 green rice leaf-hopper adults were released in the enclosure. After one day 80 percent or more of the insects were killed.

What we claim is:

1. A compound of the formula,

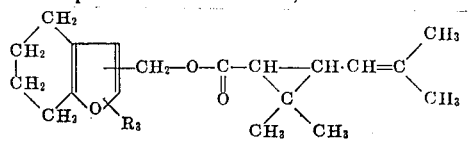

wherein $R_3$ is hydrogen or methyl.

2. 4,5-Tetramethylenefurfuryl chrysanthemate.

3. 4,5-Tetramethylene-3-furylmethyl chrysanthemate.

4. 3-Methyl-4,5-tetramethylenefurfuryl chrysanthemate.

5. 2-Methyl-4,5-tetramethylene-3-furylmethyl chrysanthemate.

* * * * *